US009242502B2

(12) United States Patent
Pohjola et al.

(10) Patent No.: US 9,242,502 B2
(45) Date of Patent: Jan. 26, 2016

(54) IDENTIFICATION DOCUMENT AND A METHOD OF PRODUCING

(75) Inventors: Teemu Pohjola, Espoo (FI); Kristian Lappalainen, Espoo (FI)

(73) Assignee: Gemalto SA, Meudon (FR)

( * ) Notice: Subject to any disclaimer, the term of this patent is extended or adjusted under 35 U.S.C. 154(b) by 547 days.

(21) Appl. No.: 13/509,610

(22) PCT Filed: Nov. 10, 2010

(86) PCT No.: PCT/EP2010/067206
§ 371 (c)(1),
(2), (4) Date: May 13, 2012

(87) PCT Pub. No.: WO2011/058054
PCT Pub. Date: May 19, 2011

(65) Prior Publication Data

US 2012/0229255 A1 Sep. 13, 2012

(30) Foreign Application Priority Data

Nov. 13, 2009 (EP) .................................... 09175926

(51) Int. Cl.
*G06F 7/04* (2006.01)
*B42D 25/41* (2014.01)
*B42D 25/00* (2014.01)

(52) U.S. Cl.
CPC ................ *B42D 25/41* (2014.10); *B42D 25/00* (2014.10); *B42D 2033/04* (2013.01); *B42D 2033/06* (2013.01); *B42D 2033/08* (2013.01); *B42D 2035/06* (2013.01); *B42D 2035/36* (2013.01)

(58) Field of Classification Search
CPC ........ B42D 15/10; B42D 25/00; B42D 25/41; B42D 2033/04; B42D 2033/06; B42D 2033/08; B42D 2035/36; B42D 2035/06
USPC ..................... 340/5.86; 283/97; 235/487, 488
See application file for complete search history.

(56) References Cited

U.S. PATENT DOCUMENTS

| | | | | |
|---|---|---|---|---|
| 3,414,998 | A * | 12/1968 | Berger .......................... | 283/113 |
| 4,222,662 | A * | 9/1980 | Kruegle .......................... | 355/40 |
| 4,579,754 | A * | 4/1986 | Maurer et al. .................. | 428/29 |

(Continued)

FOREIGN PATENT DOCUMENTS

| | | | |
|---|---|---|---|
| CA | 1279533 | C | 1/1991 |
| DE | 102007034716 | A1 | 1/2009 |
| EP | 1698485 | A2 | 9/2006 |
| WO | WO2004/074000 | | 9/2004 |

OTHER PUBLICATIONS

PCT/EP2010/067206, International Search Report, Jan. 24, 2011, European Patent Office, P.B. 5818 Patentlaan 2 NL—2280 HV Rijswijk.

*Primary Examiner* — Edwin Holloway, III
(74) *Attorney, Agent, or Firm* — The Jansson Firm; Pehr B. Jansson

(57) ABSTRACT

The invention relates to an identification document (21) comprising a non-transparent core (6), and one or more layers of a transparent material (14) arranged on at least a back (13) or a front surface (12) of said core. In order to achieve an identification document where forgery attempts are visibly detectable, the identification document (21) has a translucent security element in a region (7) where the thickness of the non-transparent core (6) material is smaller as compared to the thickness of the non-transparent core material in other parts of said core (6).

21 Claims, 2 Drawing Sheets

(56) References Cited

U.S. PATENT DOCUMENTS

| | | | | |
|---|---|---|---|---|
| 4,632,430 | A | 12/1986 | Wicker | |
| 2005/0247794 | A1* | 11/2005 | Jones et al. | 235/487 |
| 2010/0196587 | A1* | 8/2010 | Keller | 427/7 |
| 2011/0266349 | A1* | 11/2011 | Bi et al. | 235/488 |

* cited by examiner

IDENTIFICATION DOCUMENT AND A METHOD OF PRODUCING

BACKGROUND OF THE INVENTION

1. Field of the Invention

This invention relates to an identification document and in particular to a security element of such a document, which makes forgery even more difficult.

2. Description of Prior Art

Identification documents are manufactured as multilayer documents wherein information needed in the document is written to the document by laser engraving or printing, for instance. In this way, it is possible to provide the document with the necessary information such that the information is not located on the outer surfaces of the document, but instead deep inside the document on layers which cannot be reached unless the document is broken into parts. An identification document typically consists of a non-transparent core surrounded by one or more transparent surface layers.

In order to avoid forgery, the document is manufactured in such a way that it should be impossible to break the document into parts. However, if a forger for some reason manages to break an identification document into parts, the identification document needs to have a construction that ensures that the forgery can be detected due to visible marks.

SUMMARY OF THE INVENTION

An object of the present invention is to provide an identification document with a new type of security element which offers improved possibilities to visually detect forgery. Another objet is to provide a method of manufacturing such an identification document. These objects are achieved with an identification document according to independent claim 1 and a method according to independent claim 11.

In the invention, a core of a non-transparent material is provided with a translucent security element in a region where the thickness of the non-transparent core material is smaller as compared to the thickness of the non-transparent core material in other parts of said core. In this way, forgery of the document can be visually detected in said region due to the translucent security element.

Preferred embodiments of the invention are disclosed in the dependent claims.

BRIEF DESCRIPTION OF DRAWINGS

In the following, the present invention will be described in closer detail by way of example and with reference to the attached drawings, in which.

DESCRIPTION OF AT LEAST ONE EMBODIMENT

Figure 1:
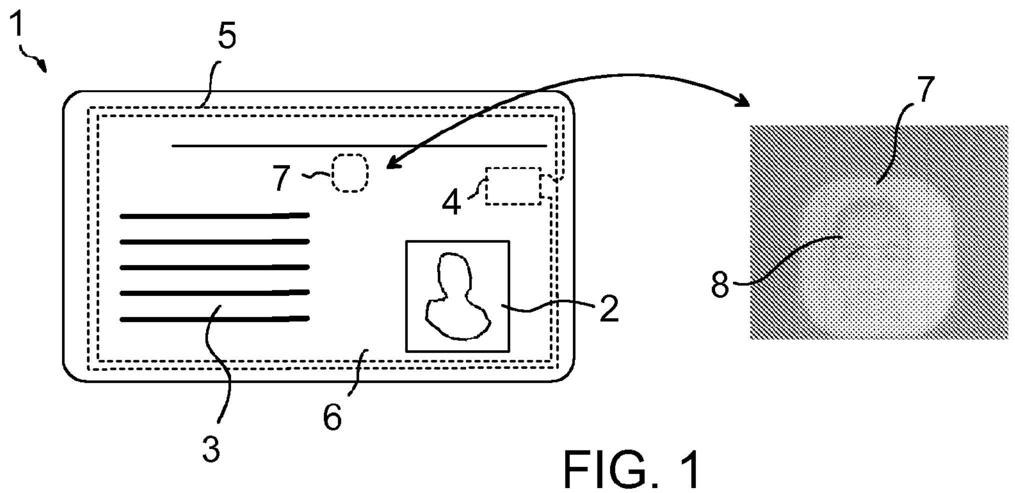
FIG. 1 illustrates a first embodiment of an identification document.

FIG. 1 illustrates a first embodiment of an identification document 1. The identification document can be an identity card of a person, a driver's license, an information page for a passport, a bank card, a credit card, or any other similar identification document that needs to have a secure construction for preventing forgery.

In the example of FIG. 1, the identification document is provided with a photo 2 of the holder (owner) of the identification document and with information 3, such as personal data, written to the identification document. In this example, though not necessarily in all embodiments, the identification document is also provided with a microchip 4 containing data, and with an antenna coil 5 connected to the microchip in order to facilitate contactless communication between the microchip 4 and an external apparatus.

The identification document comprises a non-transparent core 6 which may be produced of one or more layers arranged on top of each other. An upper and a lower surface of the core 6 are covered by a transparent material (shown in FIGS. 2 to 4). One alternative is to enclose the microchip 4 and the antenna 5 in the non-transparent material of the core 6 such that these cannot be seen through the transparent material layers arranged on the upper and lower surfaces of the core.

The photo 2 and the information 3 provided on the identification document 1 are preferably not arranged on outer surfaces of the identification document 1, but instead on or in some other layers of the identification document. One alternative is that the photo and the information have been arranged on the upper or lower surface of the core 6 by laser engraving or printing, for instance. It is also possible that the photo and the information have been arranged on several different layers, such that each of these several layers includes only a part of the photo 2 and/or information 3. The photo and/or information may also be arranged in the transparent material. In any case, the photo and the information should be arranged in such a way that it is easy to read the information and to study the photo against the background provided by the non-transparent core 6. International standards define that identification documents need to have a minimum opacity. In the illustrated embodiment, this requirement is met by the non-transparent material used in the core 6.

The different layers used to manufacture the identification document are preferably plastic layers, such as polycarbonate (PC) layers, of which some may be clear, some may be carbonized, and some may be colored. Polycarbonate layers can be attached to each other without using additional adhesive layers between them. However, in case of other materials, additional adhesive layers may be arranged between the material layers before the lamination is carried out. The layers are attached to each other by lamination at a raised temperature and pressure, for instance. This makes it possible to obtain an identification document where the different layers are permanently attached to each other in such a way that it is difficult for a forger to disassemble the identification document by separating the layers from each other for the purpose of forgery.

However, in order to ensure that visible marks are left on the identification document if an attempt to forgery is made, the identification document 1 is provided with a translucent security element in a region 7. In this connection, a translucent security element refers to a security element which cannot normally be visually seen by a viewer from at least one of the sides (front or back) of the identification document. However, when viewed in backlight, the security element can also be seen from this at least one side due to the light penetrating through the region 7. Such a translucent security element is also very difficult to produce, in case a forger attempts to make a forged identification document from new raw materials (instead of changing data of an existing authentic identification document).

In FIG. 1 the translucent security element is located in the region 7. In this region, the thickness of the non-transparent core material of the core 6 is smaller as compared to the thickness of the non-transparent core material in other parts of the core 6. Thus, when the front surface of the identification document 1 is viewed in normal lighting conditions, nothing exceptional can be seen in the region 7 (in this region only the core material can be seen). However, in backlighting conditions, such as when a lamp is placed to illuminate the back surface of the identification document 1, the translucent security element can be visually seen from the front side of the identification document 1, as illustrated on the right in FIG. 1. In the case of a forgery attempt, the shape of the translucent security element has been corrupted, which makes it possible to visually detect the forgery attempt simply by placing the identification document against a lamp while examining it.

The translucent security element may simply consist of said region 7 which has a predetermined shape, such as numbers, letters, symbols, for instance. In the case of FIG. 1, it can be seen that the region has the shape of a rounded rectangle. However, it is also possible to provide this region with a non-transparent element. In the example of FIG. 1, the region 7 has been provided with a non-transparent element 8 consisting of a photo of the holder of the identification document. The term "non-transparent" refers in this context to an element which is less translucent that the translucent security element. This photo may have been provided in the region by printing or laser engraving, for instance. When viewed in backlight, the non-transparent element 8 is therefore seen surrounded by the translucent security element in the region 7 of the identification document. An advantage with such a solution is that the non-transparent element, such as a photo of the holder, can be arranged very deep into the material of the identification document, which makes it even more difficult to reach the photo in order manipulate it in connection with forgery. The non-transparent element may also be a three dimensional element, such as a photo which has been laser engraved into several material layers. Such a solution may be accomplished by having several layers suitable for laser engraving arranged on top of each other, and possibly separated by layers not suitable for laser engraving.

To arrange a first copy of a photo of the holder such that it can be visibly seen in normal lighting conditions (as in prior art solutions), and a second copy of this same photo in the translucent security element as a non-transparent element 8 deep in the material of the identification document, makes forgery even more difficult. In such a solution both copies of the photo can be viewed simultaneously, and any visible marks due to forgery are very easy to detect.

Figure 2:
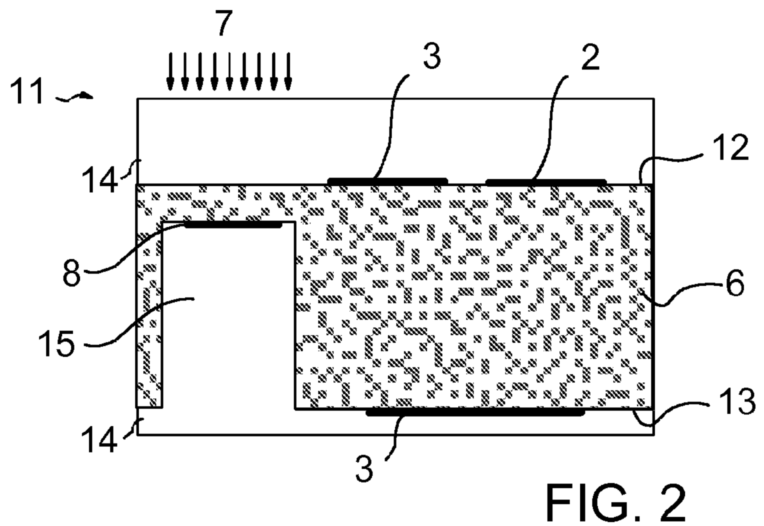
FIG. 2 illustrates a second embodiment of an identification document.

FIG. 2 illustrates a second embodiment of an identification document. The embodiment of FIG. 2 is very similar to the one explained in connection with FIG. 1. Therefore, the embodiment of FIG. 2 will be explained mainly by referring to the differences between these embodiments.

FIG. 2 illustrates the identification document as seen from an edge and the thickness of the identification document 11 has been greatly exaggerated in order to illustrate the interior construction of the identification document 11.

Also in this case, a front surface 12 and a back surface 13 of the non-transparent core 6 have been provided with one or more layers 14 of a transparent material. A microchip 4 and an antenna 5 may be enclosed in the non-transparent core. In this example, a photo 2 and information 3 have been provided on the front surface 12 of the core 6, and in addition, information 3 has been provided on the back surface 13 of the core 6.

The region 7 with a translucent security element, where the thickness of the non-transparent core 6 material is smaller as compared to the thickness of the non-transparent core material in other parts of the core 6, is clearly shown in FIG. 2. A cavity 15 provided in this region contains a non-transparent element 8, such as the photo shown in FIG. 1, or a printed or a laser induced marking. The cavity 15 may be formed in the back surface 13 of the core 6 as illustrated in the figures or, alternatively, in the front surface 14. The non-transparent element 8 may also be arranged similarly in the other embodiments. Naturally also other types of non-transparent elements can be used in this region 7. Once the upper surface in FIG. 2 is viewed in backlight (the light being directed to illuminate the cavity 15 from below in FIG. 2), the non-transparent element 8 can be seen surrounded by the translucent security element from the upper surface of the identification document 11.

The identification document 11 of FIG. 2 can be manufactured by first producing the non-transparent core 6. This can be carried out by arranging a plurality of layers on top of each other and laminating the layers to each other. A microchip and an antenna may be arranged between some of the layers. The laminating can be carried out at a raised temperature and by using a tool that pushes the layers towards each other. The tool may have a protruding part that during lamination penetrates into some of the layers and "pushes" the cavity 15 into the material of these layers. Alternatively the cavity may be produced in some other way that does not require penetration of any tool into the layers during lamination, which may be an advantage in case an antenna and a microchip is arranged between the layers. Once the non-transparent core 6 has been produced, one or more transparent layers are arranged on top of the back 13 and front 12 surfaces of the core, and a second lamination is carried out.

Alternatively, in order to produce the identification document with only one lamination step, some of the layers of the core 6 may have a hole with the size of the cavity 15 cut throughout the layer already before the layers are arranged on top of each other, in which case these holes are arranged on top of each other to form the cavity 15 before lamination. In this case, also the transparent layers 14 are arranged on the back 13 and front 12 surfaces of the core 6 prior to the only lamination step.

The cavity 15 formed in the core 6 may be filled with a suitable material, such as a suitable transparent plastic material before the transparent layers 14 are attached to the core 6. In this context, transparent refers to a material which has a smaller opacity than the material of the non-transparent core material, which makes the identification document more translucent in the region 7 than in other parts of the identification document.

Alternatively, it is possible to leave the cavity 6 empty, in which case it may be at least partly filled with the transparent material 14 or the non-transparent material of the core 6 during lamination, as the material in question partly melts and tends to flow into the cavity. In such a case, it is possible that the "empty" cavity is at least partly filled with air (or another gas) once the production of the identification document has been completed. It may be advantageous to ensure that the cavity will be completely filled with material melting and flowing into the cavity during lamination, by selecting a suitable temperature and pressure, for instance.

The non-transparent element 8 located in the translucent security element may also consist of a part of the microchip 4 or antenna 5. In such a case, the microchip 4 or the antenna 5 may be viewed through the transparent material arranged in the cavity 15.

Figure 3:
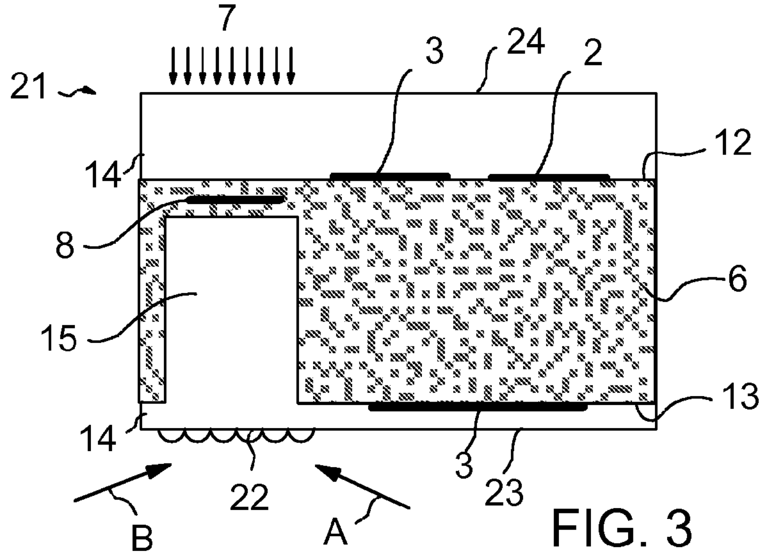
FIG. 3 illustrates a third embodiment of an identification document.

FIG. 3 illustrates a third embodiment of an identification document 21. The embodiment of FIG. 3 is very similar to the ones explained in connection with FIGS. 1 and 2. Therefore, the embodiment of FIG. 3 will be explained mainly by referring to the differences between these embodiments.

In the embodiment of FIG. 3, a visible security element 22 is located in the same part of the identification document 21 as the region 7 where the thickness of the non-transparent core material is smaller as compared to the thickness of the non-transparent core material in other parts of the core 6. In this context, "in the same part of the identification document" refers to a solution where the visible security element 22 is arranged below, on top of or in the cavity 15 arranged in said region 7. In this context, "a visible security element" refers to a security element with properties that make it very difficult for a forger to produce a copy of it.

In this example, it is assumed that the visible security element 22 is a CLI (Changeable Laser Image) or a MLI (Multiple Laser Image). The security element 22 includes a lens, which in practice is implemented as a pattern (irregular surface) in the lower surface of the identification document 21, and a pattern (figure, text or a combination of these) produced by laser engraving in the material arranged in the cavity 15. The material in the cavity 15 may consist of clear carbonized polycarbonate, for instance.

A property of both a CLI and a MLI is that the security element looks different, depending on the direction from which the security element is viewed. One alternative is that when the security element is viewed from the direction indicated by arrow A, a number series "12345678" can be seen, whereas when the security element is viewed from the direction indicated by arrow B, a text "FIN" can be seen.

In the embodiment of FIG. 3, the visible security element 22 can therefore be seen from the lower surface 23 of the identification document, when studying the lower surface during normal lighting conditions (no backlight). However, in this embodiment, the non-transparent element 8 has been arranged in the non-transparent material of the core 6. A similar arrangement of the non-transparent element 8 may be implemented also in the other embodiments. Therefore, this non-transparent element 8 cannot bee seen in normal lighting conditions from the lower surface 23 or from the upper surface 24 of the identification document. However, once the upper surface 24 is viewed in backlighting conditions (lower surface is illuminated), the translucent security element in the region 7 and the non-transparent element 8 can be seen from the upper surface 24. Similarly, once the lower surface 23 is viewed in backlighting conditions (upper surface is illuminated), the non-transparent element 8 can be seen from the lower surface.

Figure 4:
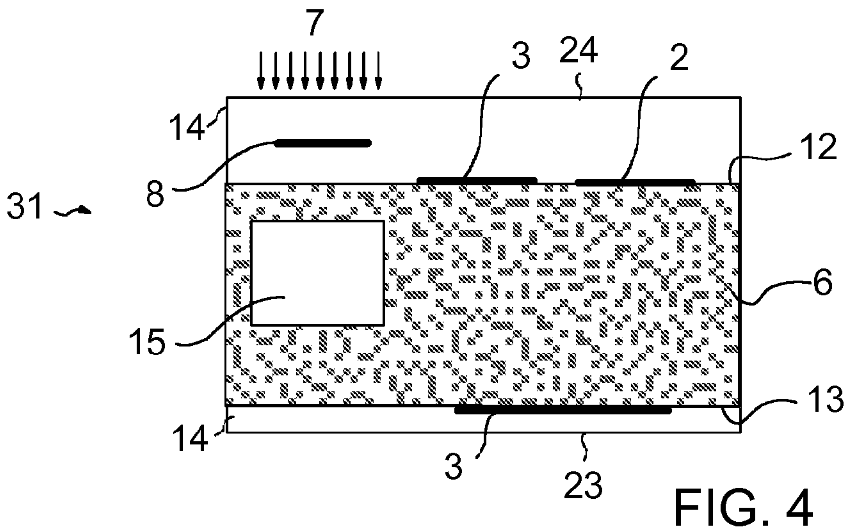
FIG. 4 illustrates a fourth embodiment of an identification document.

FIG. 4 illustrates a fourth embodiment of an identification document 31. The embodiment of FIG. 4 is very similar to the ones explained in connection with FIGS. 1 to 3. Therefore, the embodiment of FIG. 4 will be explained mainly by referring to the differences between these embodiments.

In FIG. 4, the cavity 15 is enclosed by the non-transparent core 6 material forming the back 13 and front 12 surfaces of the core 6. Therefore the cavity 15 cannot be seen when the lower 23 or the upper 24 surface of the identification document is viewed in normal lighting conditions. If the cavity has been filled with a transparent material, in other words a material having a smaller opacity than the material used in the core 6, the core does not actually enclose a cavity but instead said transparent material with a smaller opacity.

In the embodiment of FIG. 4, the non-transparent element 8 has been arranged in the transparent material 14 covering the front surface 12 of the core. As an alternative, the element 8 can be arranged in the non-transparent material 14 covering the back surface 13 of the core 8, or anywhere between these locations in the region 7.

Figure 5:
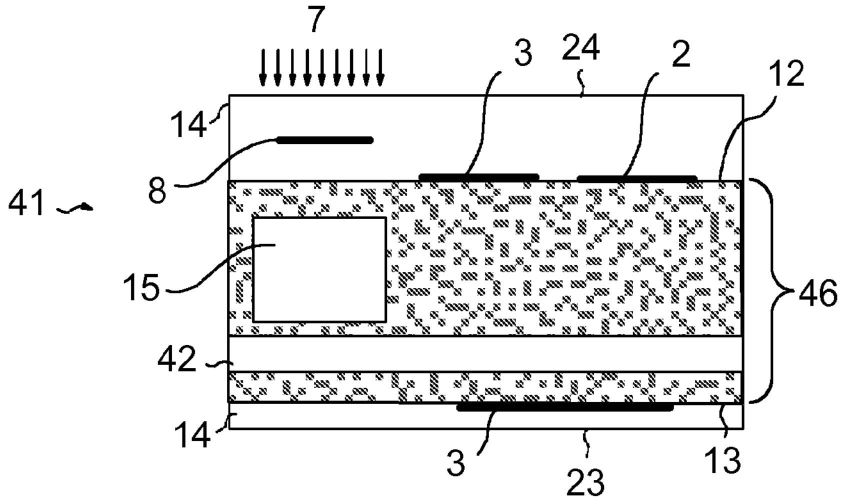
FIG. 5 illustrates a fifth embodiment of an identification document.

FIG. 5 illustrates a fifth embodiment of an identification document. The embodiment of FIG. 5 is very similar to the one explained in connection with FIG. 4. Therefore, the embodiment of FIG. 5 will be explained mainly by referring to the differences between these embodiments.

In FIG. 5, the core 46 includes an additional layer 42 of a transparent material covering substantially the entire area of the core 46. Therefore, it is not necessary for the entire material used in the core 46 to be non-transparent, but instead it is also possible to include one or more transparent layers 42 in the core 46, as long as it is ensured that the core as a whole has the required minimum opacity. Also in this embodiment, a cavity 15 has been used in the region 7 of the translucent security element to ensure that the thickness of the non-transparent core material is smaller in this region as compared to the thickness of the non-transparent core material in other parts of the core 46.

Figure 6:
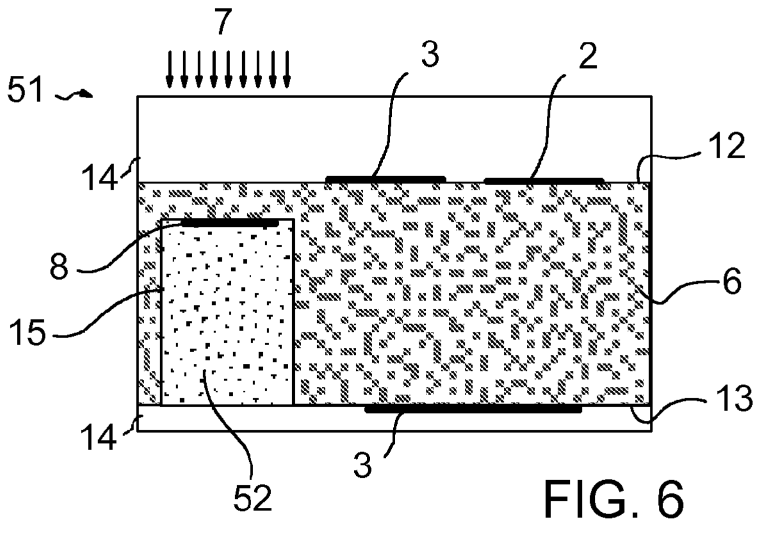
FIG. 6 illustrates a sixth embodiment of an identification document.

FIG. 6 illustrates a sixth embodiment of an identification document. The embodiment of FIG. 6 is very similar to the one explained in connection with FIG. 2. Therefore, the embodiment of FIG. 6 will be explained mainly by referring to the differences between these embodiments.

In the embodiment of FIG. 6, the cavity 15 has been filled with a material 52 that is more translucent than the rest of the core 6, however, not as transparent as the material 14 used on the front 12 and back 13 surfaces of the core. The opacity of the material 52 is therefore between the opacity of the transparent material 14 and the material of the core 6.

In the embodiment illustrated in FIG. 6 a non-transparent security element 8, such as a printed or laser induced marking, is arranged at the bottom of the cavity. This marking may, however, alternatively be completely embedded in the material 52, in other words closer to the back surface 13 than in the illustrated example.

In the embodiment of FIG. 6, the non-transparent security element 8 is easier to see in backlight from one side (from below in FIG. 6) of the identification document 51 than from the other side (from above in FIG. 6.

It is to be understood that the above description and the accompanying figures are only intended to illustrate the present invention. It will be obvious to a person skilled in the art that the invention can be varied and modified without departing from the scope of the invention.

The invention claimed is:

1. An identification document comprising:

a non-transparent core on the upper or lower surface of which a photo or information is arranged, and one or more layers of a transparent material arranged on at least a back or a front surface of said core, wherein the identification document has a translucent security element in the form of a thinner region where the thickness of the non-transparent core material is smaller, but not equal to zero, as compared to the thickness of the non-transparent core material in other parts of said core, and contains a non-transparent element located in said thinner region such that the translucent security element cannot be seen in normal lighting conditions from an upper surface of the identification document, and if the upper surface is viewed in backlighting conditions, the translucent security element can be seen from the upper surface.

2. The identification document of claim 1, wherein said core comprises in said thinner region comprises a cavity formed in said back or front surface of said core.

3. The identification document of claim 2, wherein said cavity is filled with a material having a smaller opacity than said non-transparent core material.

4. The identification document of claim 1, wherein said core comprises in said region a cavity or a material with a smaller opacity than said non-transparent core material enclosed by said non-transparent core material forming said back and front surfaces of said core.

5. The identification document according to one of claims 2 to 4, wherein said cavity is filled with a material that is more translucent than the rest of the core but not as transparent as said one or more layers of a transparent material arranged on at least a back or a front surface of said core.

6. The identification document according to one of claims 1 to 4, wherein said core or said one or more layers of a transparent material is provided with said non-transparent element which is located in the same part of the identification document as said thinner region.

7. The identification document according to one of claims 1 to 4, wherein said identification document is provided with a Changeable Laser Image or a Multiple Laser Image located in the same part of the identification document as said thinner region.

8. The identification document according to one of claims 1 to 4, wherein said non-transparent element is a part of a microchip or of an antenna located within said identification document.

9. The identification document according to one of claims 1 to 4, wherein said translucent security element consists of said region having a predetermined shape or of a plurality of similar regions each having a predetermined shape.

10. The identification document according to one of claims 1 to 4, wherein said thinner region a translucent security element comprises a security element consisting of a marking which is less translucent than said translucent security element.

11. A method of producing an identification document, comprising:

producing a core of a non-transparent material having a security element by forming a thinner region where the thickness of the non-transparent core material is smaller, but not equal to zero, as compared to the thickness of the non-transparent core material in other parts of said core, arranging a photo or information on the upper or lower surface of said core of non-transparent material;

placing a non-transparent security element in said thinner region located in said thinner region such that the translucent security element cannot be seen in normal lighting conditions from an upper surface of the identification document, and if the upper surface is viewed in backlighting conditions, the translucent security element can be seen from the upper surface, and arranging the layers such that one or more layers of a transparent material are arranged on at least a front surface or a back surface of said core.

12. The method of claim 11, wherein the step of producing further comprises:

providing said core with a cavity, and filling said cavity with a material having a smaller opacity than said non-transparent core material prior to said arranging of the one or more layers of transparent material on said back and front surfaces.

13. The method of claim 11, wherein the step of forming a thinner region comprises forming said thinner region by forming a cavity in said back or front surface of said core.

14. The method of claim 13, further comprising filling said cavity with a material having a smaller opacity than said non-transparent core material.

15. The method of claim 11, wherein said step of forming a thinner region comprises forming cavity or a material with a smaller opacity than said non-transparent core material enclosed by said non-transparent core material forming said back and front surfaces of said core.

16. The method of claim 11, wherein said core or said one or more layers of a transparent material is provided with said non-transparent element which is located in the same part of the identification document as said thinner region.

17. The method of claim 11, further comprising providing said identification document with a Changeable Laser Image or a Multiple Laser Image located in the same part of the identification document as said thinner region.

18. The identification document according to one of claim 1 wherein the non-transparent element is a photograph of a holder of the identification document.

19. The identification document according to claim 18 wherein the photograph is composed of elements in several layers of the identification document.

20. The identification document according to claim 18 wherein the photograph is a duplicate of a photograph on the identification document that can be seen during normal lighting conditions.

21. The identification document according to claim 1 wherein the non-transparent element comprises a part of a microchip or an antenna.

* * * * *